Figure 10A:
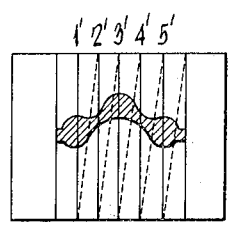

United States Patent [19]

Shibata et al.

[11] 3,794,427

[45] Feb. 26, 1974

[54] OPTICAL PROFILE DETECTOR WHOSE FUNCTION IS NOT ADVERSELY AFFECTED BY SURFACE CONDITIONS OF STRIP-SHAPED MEMBER

[75] Inventors: Hideo Shibata; Takashi Emori, both of Yokohama; Kazuo Kurasawa; Masao Okabe, both of Hamamatsu; Tamio Santo, Amagasaki, all of Japan

[73] Assignees: Ishikawajima-Harima Jukogyo Kabushiki Kaisha, Tokyo-to; Hamamatsu Terebi Kabushiki Kaisha, Hamatsu-shi, Shizuoka-ken, both of, Japan

[22] Filed: June 6, 1972

[21] Appl. No.: 260,072

[30] Foreign Application Priority Data
June 8, 1971  Japan.............................. 46-40890

[52] U.S. Cl. .......... 356/120, 250/219 DF, 356/200, 356/237
[51] Int. Cl. .......................................... G01n 21/32
[58] Field of Search...250/219 DF; 356/120, 199, 200

[56] References Cited
UNITED STATES PATENTS

| 3,176,306 | 3/1965 | Burns........................ 250/219 DF X |
| 3,230,305 | 1/1966 | Kendrick.................. 250/219 DF X |
| 3,280,692 | 10/1966 | Milnes et al............. 250/219 DF X |
| 3,590,258 | 6/1971 | Shibata et al................... 356/120 X |

*Primary Examiner*—Ronald L. Wibert
*Assistant Examiner*—F. L. Evans
*Attorney, Agent, or Firm*—A. C. Nolte, Jr.; Edward B. Hunter; C. Bruce Hamburg

[57] ABSTRACT

An optical profile detector is provided in which a light pattern projected upon the surface of a specimen is varied depending upon the profile of the specimen; and the projected light image is scanned into electrical signals which in turn are shaped into pulses so that the deviations in profile of the specimen from the standards may be detected from the deviations of the time intervals between the pulses from a predetermined time interval.

2 Claims, 23 Drawing Figures

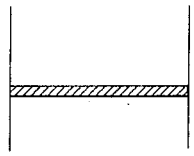
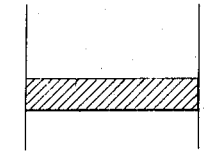
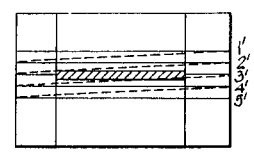
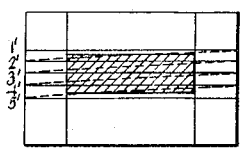
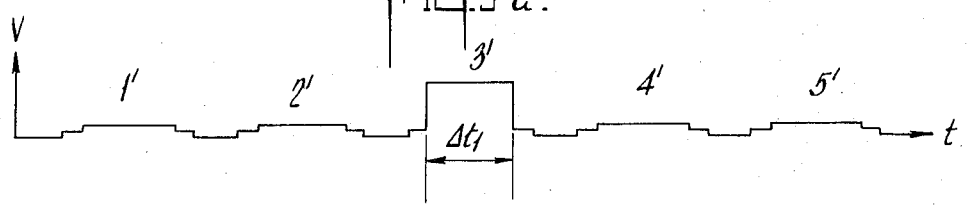
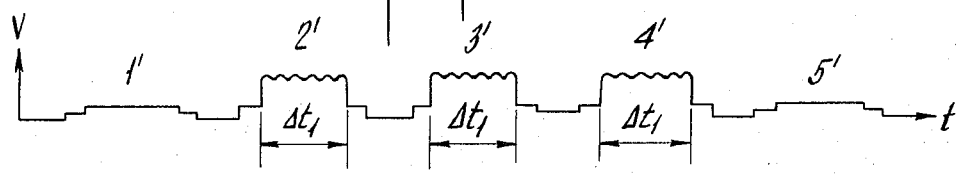
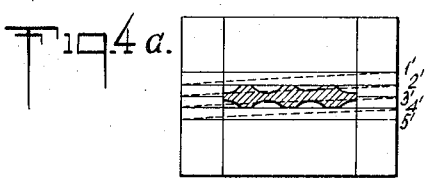
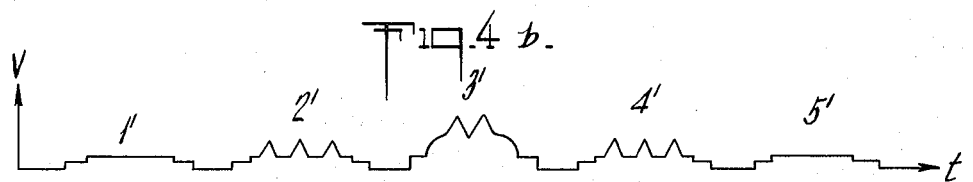
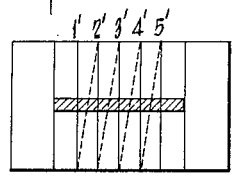
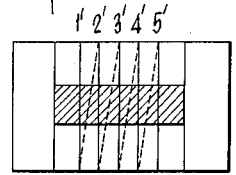

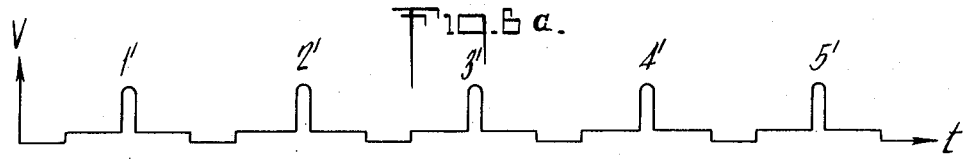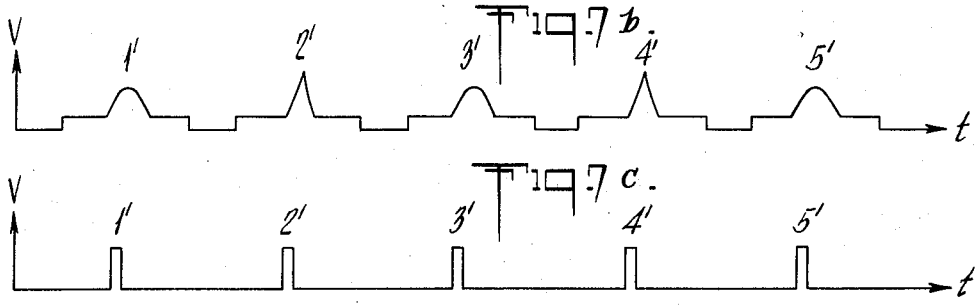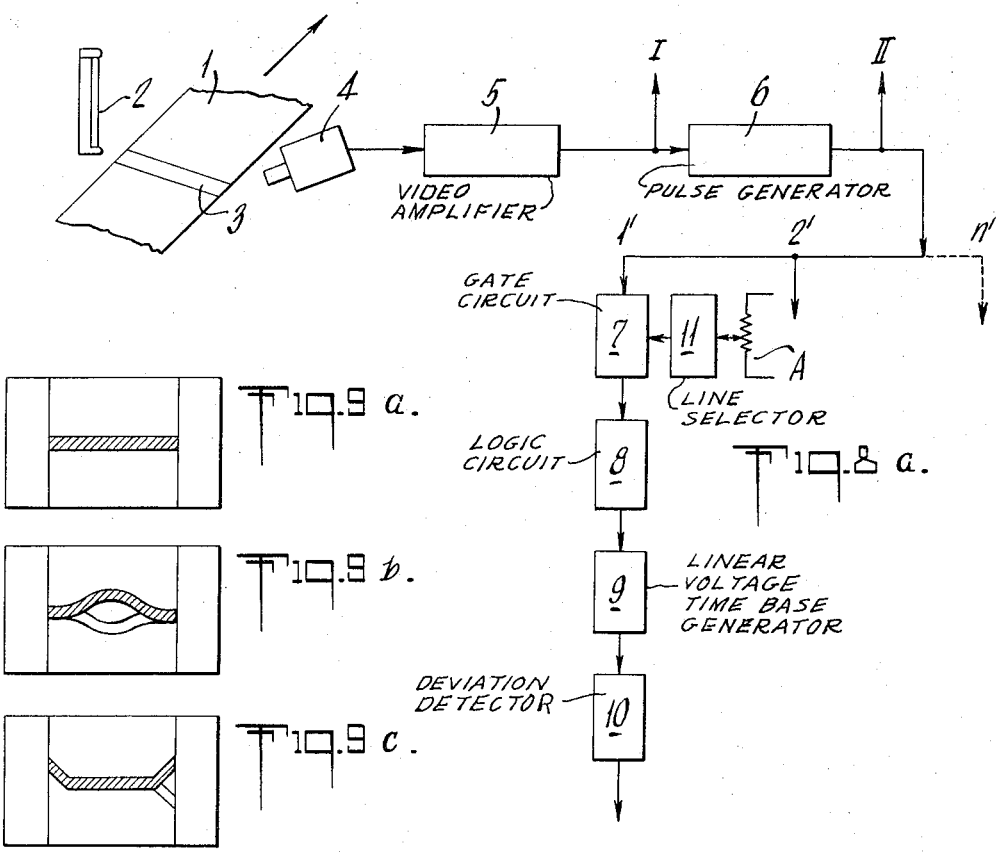

OPTICAL PROFILE DETECTOR WHOSE FUNCTION IS NOT ADVERSELY AFFECTED BY SURFACE CONDITIONS OF STRIP-SHAPED MEMBER

Various optical measuring methods have been used in detecting the flatness of the surface of a strip-shaped or band-like specimen. In one method employing an industrial television, a light pattern such as a bar is projected upon the surface of the specimen and scanned by a television camera so that the flatness of the specimen may be detected from the deviation of the projected or reflected light pattern from its correct profile. However, the method for detecting the surfaces of products by the industrial television has many defects. The present invention therefore relates to an optical profile which may overcome the various defects and problems encountered in the prior art optical profile detectors.

The present invention was made to overcome these and other related problems and defects encountered in the prior art optical measuring instruments or the like. Briefly stated, the present invention is characterized by comprising means for projecting a light pattern upon the surface of a member to be detected, said projected light pattern changing its profile depending upon the variations in profile of said member to be detected, means for transversely scanning said projected light pattern, a detecting circuit for detecting the brightest point from the video signals obtained from each scanning by said scanning means, sampling lines and a line selector circuit for obtaining the profile of points in the transverse direction of said member to be detected, a linear voltage time-base generator, and a deviation detecting circuit to which are applied the output and pulses from said sampling lines and said selector circuit through said linear voltage time-base generator.

FIGS. 1a and 1b are views for explanation of the relation between the surface conditions of a strip-shaped member and light patterns projected and formed thereupon; FIGS. 2a and 2b are views used for explanation of the prior art method for scanning the light patterns shown in FIG. 1; FIGS. 3a and 3b show waveforms of the video signal voltages with respect to time obtained by the scanning method shown in FIG. 2; FIGS. 4a and 4b are views used for explanation of the adverse effects of the locally contaminated or deformed areas on the surface of the strip-shaped member upon the light image pattern form thereupon and the relation between the video signals thereof and time; FIGS. 5a and 5b are views used for explanation of the scanning method used in the present invention for scanning the light images formed upon the strip-shaped members having the smooth and rough surfaces; FIGS. 6a and 6b illustrate the waveforms of the video signal voltages obtained by the scanning method in accordance with the present invention; FIG. 7a is a view illustrating the light image whose profile is affected by the locally contaminated or deformed areas of the surface; FIGS. 7b and 7c illustrate the waveforms of the video signal voltage obtained by scanning the light image shown in FIG. 7a and of the pulses representing the positions of the brightest points in the scanning lines; FIG. 8a is a block diagram of one preferred embodiment of an optical profile detector in accordance with the present invention; FIG. 8b is a view used for explanation of the sampling of the scanning lines; FIGS. 9a, 9b and 9c illustrate the relation between the light images formed by the projection of a bar-shaped light pattern upon the surfaces of strip-shaped members and the profiles thereof; FIG. 10a is a view illustrating the light image formed upon the surface of a strip-shaped member having its center portion recessed or raised and the method for scanning this light image; and FIGS. 10b and c illustrate the waveforms of the video signal voltage obtained by the scanning of the light image shown in FIG. 10a and of the pulse train obtained from said video signal voltage.

Prior to the description of the preferred embodiment of the present invention, the prior art optical measuring method will be briefly described with reference to FIGS. 1 – 4. In the prior art optical measuring method employing the industrial television, the measurement is adversely affected by the surface conditions of a strip-shaped specimen. When the specimen has a mirror surface, the bar-shaped light image or pattern formed on or reflected from the surface of the specimen is very clear as shown in FIG. 1a but when the specimen has a pear-skin surface having microscopically small irregularities, the light image projected is scattered so that the vague light image is obtained as shown in FIG. 1b. Therefore, the images as shown in FIGS. 2a and 2b are viewed on the faceplate of a picture tube of the television respectively when the specimens have a mirror surface and a pear-skin surface. When the light image formed upon or reflected from the specimen is scanned by, for example, five scanning lines 1', 2', 3', 4' and 5' in the longitudinal direction of the light image, the relation between the video signal voltage and the time shown in FIG. 3 is obtained. In FIG. 3, the video signal voltage is plotted along the ordinate whereas the time along the abscissa. When the specimen has a mirror surface as shown in FIG. 2a, the area of the light image scanned by the third scanning line 3' is very bright because the third scanning is made along the very narrowly concentrated light image pattern so that the video signal voltage obtained by the third scanning line is higher than those obtained by the scanning lines 1', 2', 4' and 5' as shown in FIG.3a. Furthermore, the level of the video signal voltage is maintained at a constant level during the scanning time $\Delta t_1$. However, when the light pattern is projected upon the specimen having a pear-skin surface, it is scattered so that the width of the bar-shaped light image pattern is increased as shown in FIG.2b whereas the brightness of the light image per unit area is decreased. As a result, the high video signal voltages appear along the scanning lines 2', 3' and 4' as shown in FIG.3b. Furthermore, each high voltage level which lasts $\Delta t$ has very small peaks as shown in FIG.3b.

As described above, in the prior art optical measuring method employing the industrial television the measurement is affected by the surface conditions of the specimen so that it is impossible to measure or detect the whole profile of strip-shaped specimen from the video signals.

Furthermore, in some strip products they are purposely rolled so as to impart the pear-skin surfaces thereto in order to enhance the coating, and some strip-shaped members have locally contaminated or deformed areas so that the projected light pattern appears as shown in FIG.4a. As a result, the video signal voltages appear as shown in FIG.4b, from which it is seen that the variation in video signal voltage obtained from the scanning lines 1'–5' is very irregular.

In order to overcome these problems, there has been proposed a method in which a clipper is used to clip the video signal voltage V less than a predetermined level so that the true light image projected onto and formed on the surface of the specimen may be reproduced for measuring or detecting the profile of the strip-shaped specimen. However, this method has also defects that the measurement or detection is adversely affected by the locally contaminated or deformed areas of the surface and that the use is limited only to a strip-shaped member having a mirror surface.

Now referring to FIG.8, one embodiment of the present invention will be described. The optical profile detector in accordance with the present invention comprises a light source 2 which is vertically disposed laterally of an elongated strip-shaped member 1 travelling in the direction indicated by the arrow and which projects an elongated light image 3 upon the strip-shaped member at a right angle relative to the travelling direction thereof; a television camera 4 which scans the projected light image 3 at right angles; a video amplifier 5 for amplifying the signals from the camera 4; a detector or pulse generator 6 which is capable of detecting the brightest point in the scanning lines $1', 2', 3', \ldots, n'$ and generating the pulses in response to the detected brightest points; a sampling line A an a line selector 11 for selecting one of the scanning lines in response to the pulses representing the brightest points in the scanning lines $1' - n'$; a gate circuit 7, a logic circuit or arithmetic circuit 8, a linear voltage time base generator 9 which is capable of linearly increasing the voltage; and a deviation detector 10.

The elongated light image 3 projected by the light source 2 is scanned by the camera 4, and the signals are fed into a monitor from the points I and II. When the strip-shaped member 1 has a mirror surface, a sharp line is viewed but when the strip-shaped member 1 has a peark-skin surface, a relatively broad line is viewed.

Figure 10B:
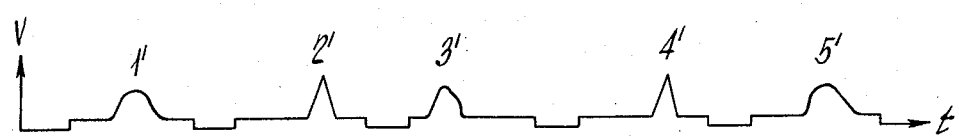
Figure 10C:
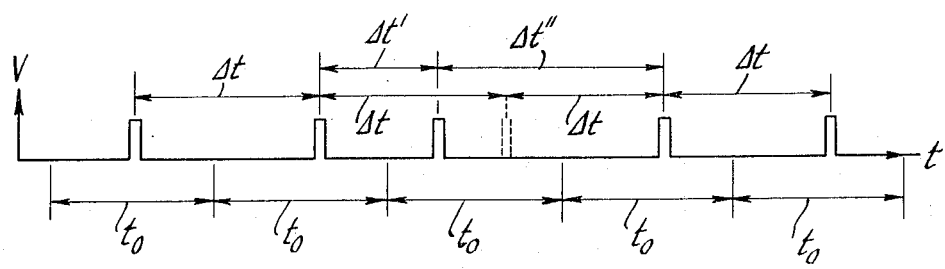

When the light image 3 is scanned with five scanning lines $1', 2', 3', 4'$ and $5'$, the strip-shaped member having a mirror surface is monitored as shown in FIG.5a whereas the strip-shaped member having a pear-skin surface is monitored as shown in FIG. 5b, and the video signals shown in FIGS.6a and 6b are obtained. In FIG.6, the signal voltage is plotted along the ordinate whereas time, along the abscissa, and each scanning line has one peak. If the surface of the strip-shaped member 1 is contaminated or deformed locally as shown in FIG.7a, the duration of the peaks in the scanning lines $1', 3'$ and $5'$ becomes longer than that of the peaks in the scanning lines $2'$ and $4'$ as shown in FIG.7b. However, when the rectangular pulses are generated by the pulse generator 6, the voltge signals as shown in FIG.7c are obtained. That is, the pulses are generated in response to the peaks in the scanning lines. The three examples of the relations between the surface conditions of the strip-shaped member 1 and the light images 3 projected thereupon from the light source 2 are illustrated in FIG.9. When the surface is flat, the projected image is straight as shown in FIG.9a. If the surface has a recess or raised portion at the center, the light image is curved at the center as shown in FIG.9b. If the surface has bends along the side edges thereof, the light image is bent at both ends as shown in FIG.9c. For example, the detection of the surface having a recess or raised portion at the center will be described. The light image 3 shown in FIG. 10a is scanned with five scanning lines $1' - 5'$ in the travelling direction of the strip-shaped member 1. In this case, the relation between the signal voltage V and time $t_o$ as shown in FIG.10b is obtained for each scanning line. These signals are shaped into the pulses as shown in FIG.10c by the pulse generator 6 (See FIG. 8). If the strip-shaped member 1 has a flat surface, the time intervals between the adjacent pulses which correspond to the scanning lines $1' - 5'$ are equal to $\Delta t$, but in case of the light image shown in FIG.10(a) which the portion of the light image 3 scanned by the third scanning line is deviated upwardly so that the pulse corresponding to the scanning line $3'$ is displaced to the left as indicated by the solid lines in FIG.10c. That is, the time interval between the pulses corresponding to the scanning lines $2'$ and $3'$ becomes $\Delta t' < \Delta t$. Similarly the time interval between the pulses corresponding to the scanning lines $3'$ and $4'$ becomes $\Delta t'' > \Delta t$.

In order to sample one scanning line for example line $1'$ in response to the pulses $1' - 5'$ representing the brightest points in the scanning lines $1' - 5'$, the sampling lines from $1'$ to $n'$ are provided so that the line selector 11 generates a pulse for selecting the desired scanning line $1'$. The pulse representing the brightest point in the sampled scanning line and the pulse from the line selector 11 are applied to the gate circuit 7, the output of which is fed into the logic circuit 8. The output of the logic circuit 8 is fed to the voltage generator whose output is fed into the deviation detector 10. In the deviation detector, the center of the pulse is detected so that the data of the profile of the area of the strip-shaped member 1 scanned by the scanning line $1'$ may be obtained. The data may be also obtained through the gate circuit 7, the arithematic circuit which is used instead of the logic circuit 8, the voltage generator 9, and the deviation detecting circuit 10.

In a manner similar to that described above, the scanning lines $2', 3', 4', \ldots$ and $n'$ are sequentially sampled so that the deviation of the positions of the pulses $1', 2', \ldots$ and $n'$ from the correct positions may be obtained. Thus, the deviation of the surface of the strip-shaped member 1 from the correct profile may be detected.

In the optical pattern detector in accordance with the present invention, the scanning method is not limited to the above described method in which the optical pattern or light image is scanned at right angles relative thereto, and any other scanning method for scanning transversely the light image may be employed.

According to the present invention, the deviation of the profile of the strip-shaped member from the correct profile is detected by detecting the deviations of the pulses from their correct positions. Therefore, the correct profile is not limited to the straight light image described in the instant embodiment.

In the optical pattern detector in accordance with the present invention, an optical pattern such as a bar, a spot and the like is projected upon a strip-shaped or band member such as a strip of plastic, paper, glass sheet or the like. Alternatively, the optical pattern may be projected upon the strip-shaped member and reflected upon a screen or the like. Furthermore, the dissection method may be employed so that the reflected image, virtual image or dissected image of an optical pattern may be provided. The light image thus obtained is scanned by the camera in the direction of the travel of the strip-shaped member so as to be converted into the electrical signals. The electrical signals thus obtained are shaped into the pulses so that the deviation of the strip-shaped member from the correct profile may be detected from the deviation of the time interval between the pulses from a predetermined time interval. The detection of the surface profile of the strip-shaped member is based upon the deviation of the center of the light image in the scanning direction so that the detection will not be adversely affected from the locally contaminated or deformed surface of the strip-shaped member. The optical surface profile detector in accordance with the present invention finds a wide application; the cost is low; and the maintenance and operation are very simple.

What is claimed is:

1. An optical profile detector whose function is not adversely affected by the surface conditions of a strip-shaped member comprising means for projecting a light pattern upon the surface of a member to be detected, said projected light pattern changing its profile depending upon the variations in profile of said member to be detected, means for scanning transversely said projected light pattern and for producing video signals therefrom, a detecting circuit for detecting the brightest point from the video signals obtained from each scanning by said scanning means, sampling lines and a line selector circuit for obtaining the profile of points in the transverse direction of said member to be detected, a linear voltage time base generator, and a deviation detecting circuit to which are applied the output and pulses from said sampling lines and said selector circuit through said linear voltage time-base generator.

2. An optical profile detector whose function is not adversely affected by the surface conditions of a strip-shaped member, comprising means for projecting a light pattern upon the surface of a member to be detected, said projected light pattern changing its profile depending upon the variations in profile of said member to be detected, means for transversely scanning said projected lignt pattern and for producing video signals therefrom, a detecting circuit for detecting the brightest point from the video signals obtained from each scanning by said scanning means, a pulse generator for generating pulses in response to the brightest points detected by said detecting circuit, sampling lines and a line selector circuit for obtaining the profile of points in the transverse direction of said member to be detected, a linear voltage time base generator, and a deviation detecting circuit to which are applied the output and pulses from said sampling lines and said selector circuit through said linear voltage time-base generator.

* * * * *